(12) United States Patent
Yoon

(10) Patent No.: US 10,618,773 B2
(45) Date of Patent: Apr. 14, 2020

(54) ELEVATOR OPERATION CONTROL DEVICE AND METHOD USING MONITOR

(71) Applicant: Il Shik Yoon, Seoul (KR)

(72) Inventor: Il Shik Yoon, Seoul (KR)

( * ) Notice: Subject to any disclaimer, the term of this patent is extended or adjusted under 35 U.S.C. 154(b) by 0 days.

(21) Appl. No.: 16/461,442

(22) PCT Filed: Jan. 24, 2018

(86) PCT No.: PCT/KR2018/001051
§ 371 (c)(1),
(2) Date: May 16, 2019

(87) PCT Pub. No.: WO2018/147576
PCT Pub. Date: Aug. 16, 2018

(65) Prior Publication Data
US 2019/0344998 A1    Nov. 14, 2019

(30) Foreign Application Priority Data

Feb. 8, 2017    (KR) .................. 10-2017-0017351

(51) Int. Cl.
*B66B 1/14*    (2006.01)
*B66B 1/46*    (2006.01)
(Continued)

(52) U.S. Cl.
CPC .............. *B66B 1/463* (2013.01); *B66B 1/468* (2013.01); *B66B 1/52* (2013.01); *B66B 3/002* (2013.01);
(Continued)

(58) Field of Classification Search
USPC ........................................................ 187/388
See application file for complete search history.

(56) References Cited

U.S. PATENT DOCUMENTS

| 2014/0201689 A1* | 7/2014 | Bedikian | G06F 3/011 715/863 |
| 2015/0130715 A1* | 5/2015 | Izumi | G06F 3/017 345/157 |

(Continued)

FOREIGN PATENT DOCUMENTS

| JP | 2006-056700 | 3/2006 |
| JP | 2014-179032 | 9/2014 |

(Continued)

OTHER PUBLICATIONS

International Search Report dated May 4, 2018 for PCT/KR2018/001051.

(Continued)

*Primary Examiner* — Christopher Uhlir

(57) ABSTRACT

A device for controlling an operation of an elevator by using a monitor comprises: a monitor, which is installed on a wall surface of a cage of an elevator, a surface of a door of the elevator, or a wall surface of a building next to the door of the elevator, displays various buttons including a start button, an emergency button, and floor buttons controlling an operation of the elevator, and includes an embedded speaker; two pin cameras positioned at upper left and right sides of the monitor, respectively; and a controller, which controls operations of the various buttons of the monitor, an operation of the pin camera, and the operation of the elevator.

10 Claims, 10 Drawing Sheets

(51) Int. Cl.

| | | |
|---|---|---|
| *B66B 1/52* | (2006.01) | |
| *B66B 3/00* | (2006.01) | |
| *G06F 3/0484* | (2013.01) | |
| *G06F 3/0488* | (2013.01) | |
| *G06F 3/16* | (2006.01) | |
| *G09G 5/373* | (2006.01) | |
| *G09G 5/38* | (2006.01) | |
| *H04N 5/225* | (2006.01) | |
| *H04N 5/232* | (2006.01) | |
| *H04N 5/247* | (2006.01) | |
| *H04R 1/02* | (2006.01) | |

(52) U.S. Cl.
CPC ........ *G06F 3/0484* (2013.01); *G06F 3/04886* (2013.01); *G06F 3/165* (2013.01); *G09G 5/373* (2013.01); *G09G 5/38* (2013.01); *H04N 5/2253* (2013.01); *H04N 5/232* (2013.01); *H04N 5/247* (2013.01); *H04R 1/028* (2013.01); *B66B 2201/101* (2013.01); *B66B 2201/463* (2013.01); *B66B 2201/4623* (2013.01); *G06F 2203/04803* (2013.01); *G09G 2340/045* (2013.01); *G09G 2340/0471* (2013.01); *G09G 2354/00* (2013.01); *H04R 2499/15* (2013.01)

(56) References Cited

U.S. PATENT DOCUMENTS

| | | | | |
|---|---|---|---|---|
| 2015/0232300 | A1* | 8/2015 | Preston | .................. B66B 1/468 |
| | | | | 187/395 |
| 2019/0033979 | A1* | 1/2019 | Bedikian | ................. G06F 3/011 |

FOREIGN PATENT DOCUMENTS

| | | |
|---|---|---|
| KR | 10-2010-0005155 | 1/2010 |
| KR | 10-2012-0123866 | 11/2012 |
| KR | 10-1667510 | 10/2016 |
| WO | WO 01/096224 | 12/2001 |

OTHER PUBLICATIONS

Office Action dated Jun. 2, 2017 corresponding to Korean Patent Application No. 10-2017-0017351.

* cited by examiner

ELEVATOR OPERATION CONTROL DEVICE AND METHOD USING MONITOR

This application claims the priority of Korean Patent Application No. 10-2017-0017351, filed on Feb. 8, 2017 in the KIPO (Korean Intellectual Property Office), the disclosure of which is incorporated herein entirely by reference. Further, this application is the National Stage application of International Application No. PCT/KR2018/001051, filed Jan. 24, 2018, which designates the United States and was published in Korean. Each of these applications is hereby incorporated by reference in their entirety into the present application.

TECHNICAL FIELD

The present invention relates to a device and a method of controlling an operation of an elevator by using a monitor, and particularly, to a device and a method of manipulating a display of a monitor of an elevator and preventing a malfunction of the display of the monitor by using two pin cameras.

BACKGROUND ART

For selection of a floor and elevation of an elevator, it is general to install a general hall button on a wall surface of a building next to a door of the elevator. However, in order to install the hall button, it is necessary to drill a hole on the wall surface of the building to install the hall button in the hole, and various wires needs to be connected. Since the hall button needs to be installed on every floor of the building, the installation of the hall button is work consuming considerable time and cost.

In addition, in the case of a general tall building, floor selection buttons as many as the number of floors are disposed in the hall button in small sizes due to the many floors, so that particularly, there are many cases where passengers having poor vision often have difficulty in selecting a floor selection button.

In order to solve the problem, Korean Patent No. 1667510, which was registered on Oct. 12, 2016, by the present applicant discloses the invention of controlling an operation of an elevator by using a monitor, but the invention has a problem in that a structure is complex due to the six pin cameras, it is inconvenient for visually and audibly impaired people and short children to use the invention, and it is impossible to prevent a malfunction by fun and the like.

DISCLOSURE OF THE INVENTION

Technical Problem

An object of the present invention is to provide a device and a method of controlling an operation of an elevator by using a monitor, which have the decreased number of pin cameras to simplify a structure, are easily used by visually and audibly impaired people and short children, and are capable of preventing a malfunction by fun and the like.

Technical Solution

In order to solve the object, the present invention provides a device for controlling an operation of an elevator by using a monitor, the device including: a monitor M, which is installed on a wall surface of a cage of an elevator, a surface of a door of the elevator, or a wall surface of a building next to the door of the elevator, displays various buttons including a start button, an emergency button, and floor buttons controlling an operation of the elevator, and includes an embedded speaker; two pin cameras P1 and P2 positioned at upper left and right sides of the monitor M, respectively; and a controller, which controls operations of the various buttons of the monitor M, an operation of the pin camera, and the operation of the elevator, in which the controller controls the two pin cameras P1 and P2 next to each other on the front surface of the monitor M to photograph images, respectively, and sequentially sets two-dimensional virtual screens z1, z2, and z3 at intervals parallel to the monitor M based on photographing angles of the pin cameras P1 and P2 in an overlapping photographed area, in which virtual screen z1 among virtual screens z1, z2, and z3 is formed to be closest to the monitor, and screen z3 is formed to be farthest from the monitor, and the controller controls the various buttons to be displayed on the monitor M, and when an operator including a finger of a passenger touches virtual screens z1 to z3 in order of z3, z2, and z1, the controller activates a selected button among the various buttons of the monitor and controls the operation of the elevator according to the activated button, and when the operator touches virtual screen z3, the controller displays a cursor 40 having a basic size on the monitor M and determines whether the operator approaches toward virtual screen z2 at a center position, and when it is determined that the operator approaches toward virtual screen z2, the controller enlarges the size of the cursor 40.

A child mode selection button 10 and a standard return button 20 may be displayed in a lower portion and an upper portion of the monitor M, respectively, and when the child mode selection button 10 is operated under the control of a monitor controller MC, all of the buttons of the monitor may be displayed in the lower portion of the monitor M, and when a predetermined time elapses without any operation of a button or the standard return button 20 is operated, all of the buttons may be returned to original states.

The pin cameras P1 and P2 may be embedded in a pin camera embedded box 30 installed in the upper portion of the monitor M, and the pin cameras P1 and P2 photograph images through an opened lower portion of the pin camera embedded box 30.

Further, the present invention provides a method of controlling an operation of an elevator performed by a device for controlling an operation of an elevator, the device including: a monitor M, which is installed on a wall surface of a cage of an elevator, a surface of a door of the elevator, or a wall surface of a building next to the door of the elevator and displays various buttons controlling an operation of the elevator; two pin cameras P1 and P2 positioned at upper left and right sides of the monitor M, respectively; and a controller, which controls operations of the various buttons of the monitor M, an operation of the pin camera, and the operation of the elevator, the method including: photographing, by the two pin cameras P1 and P2 next to each other on the front surface of the monitor M, images, respectively, and sequentially setting two-dimensional virtual screens z1, z2, and z3 at intervals parallel to the monitor M based on photographing angles of the pin cameras P1 and P2 in an overlapping photographed area, in which virtual screen z1 among virtual screens z1, z2, and z3 is formed to be closest to the monitor, and screen z3 is formed to be farthest from the monitor, and displaying various buttons through the monitor M; determining whether virtual screen z3 is touched by an operator; when it is determined that the operator touches virtual screen z3, displaying a cursor 40 having a basic size on the monitor M; determining whether the operator approaches toward virtual screen z2 at a center position; when it is determined that the operator does not approach toward virtual screen z2, returning to the determining whether virtual screen z3 is touched by the operator, and when it is determined that the operator approaches toward virtual screen z2, enlarging the size of the cursor 40; determining whether there is a button overlapping the cursor 40 by a predetermined size or more among the various buttons, on which the cursor 40 is displayed, after the operator touches virtual screen z2 and determining a selected button; when it is determined that the operator does not touch virtual screen z2, returning to the determining whether the operator approaches toward virtual screen z2, and when it is determined that the operator touches virtual screen z2, enlarging the selected button or displaying the selected button in desired graphic; determining whether the operator touches virtual screen z1; when it is determined that the operator does not touch virtual screen z1, returning to the determining whether there is a button overlapping the cursor 40 by the predetermined size or more among the various buttons, on which the cursor 40 is displayed, and determining the selected button, and when it is determined that the operator touches virtual screen z1, registering the selected button; and executing an operation corresponding to the registered button.

In the method, the executing of the operation corresponding to the registered button may include: determining whether the operator vertically moves back with respect to the monitor; and when it is determined that the operator vertically moves back, executing the operation corresponding to the registered button.

The executing of the operation corresponding to the registered button may further include: when it is determined that the operator does not move back in the determining of whether the operator vertically moves back, determining whether the operator horizontally moves by a predetermined distance; when it is determined that the operator horizontally moves, cancelling the registration of the button; and displaying a request for re-registration through the monitor.

The device for controlling the operation may further include a speaker embedded in the monitor, and the method may further include: when it is determined that the operator approaches virtual screen z2 after touching virtual screen z3, outputting a predetermined voice signal through the speaker; when it is determined that the operator touches virtual screen z2, outputting a part of a voice signal of a floor corresponding to the selected button through the speaker; and when it is determined that the operator touches virtual screen z1, outputting the remaining voice signal of the floor through the speaker.

The device may further include a speaker embedded in the monitor, in which when it is determined that the operator touches virtual screen z3 and then approaches virtual screen z2, the controller may enlarge the size of the cursor 40 and output a predetermined voice signal through the speaker, when it is determined that the operator touches virtual screen z2, the controller may output a part of a voice signal of a floor corresponding to the selected button overlapping the cursor 40 by a predetermined size or more through the speaker, and when it is determined that the operator touches virtual screen z1, the controller may output the remaining voice signal of the floor through the speaker.

In the device according to the present invention, before the controller activates the selected button among the various buttons of the monitor and then controls the operation of the elevator according to the activated button, when the controller determines whether the operator vertically moves back with respect to the monitor, and when it is determined that the operator vertically moves back, the controller may execute the operation of the elevator corresponding to the activated button, and when it is determined that the operator does not vertically move back, the controller may determine whether the operator horizontally moves by a predetermined distance, and when it is determined that the operator horizontally moves, the controller may cancel the activation of the selected button and display a request for re-registration through the monitor.

Advantageous Effects

According to the present invention configured as described above, only two pin cameras are used, so that a structure of the present invention is simplified and it is easy to maintain and repair the present invention, and visually and audibly impaired people and short children are capable of easily using the present invention, and it is possible to prevent a malfunction due to fun and the like.

MODE FOR CARRYING OUT THE INVENTION

Figure 1:
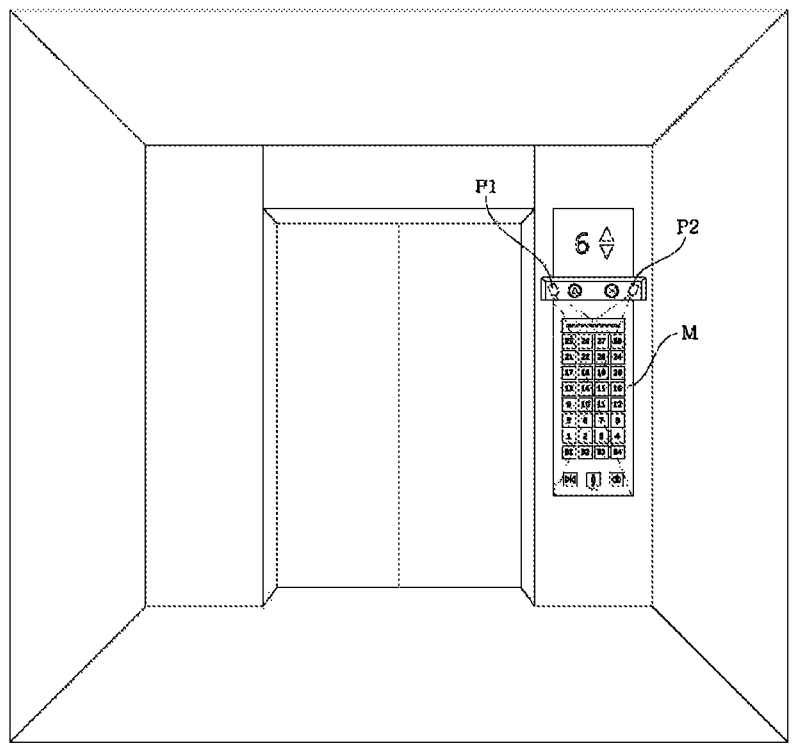
FIG. 1 is a front view viewed from an interior of a cage of an elevator toward a door side in order to show a device of the present invention.

FIG. 1 is a front view viewed from an interior of a cage of an elevator toward a door side in order to show a device of the present invention, and for convenience of the description, the present invention will be described on an assumption that a floor where an elevator is supposed to move is "the sixth floor".

As illustrated, a monitor M is installed on a wall surface of a cage next to a door of an elevator, and various buttons including a start button, an emergency button, and floor buttons for controlling an operation of an elevator are displayed on the monitor, and a speaker (not illustrated) is embedded in the monitor. Two pin cameras P1 and P2 are installed at left and right upper sides of the monitor M, respectively.

Figure 2:
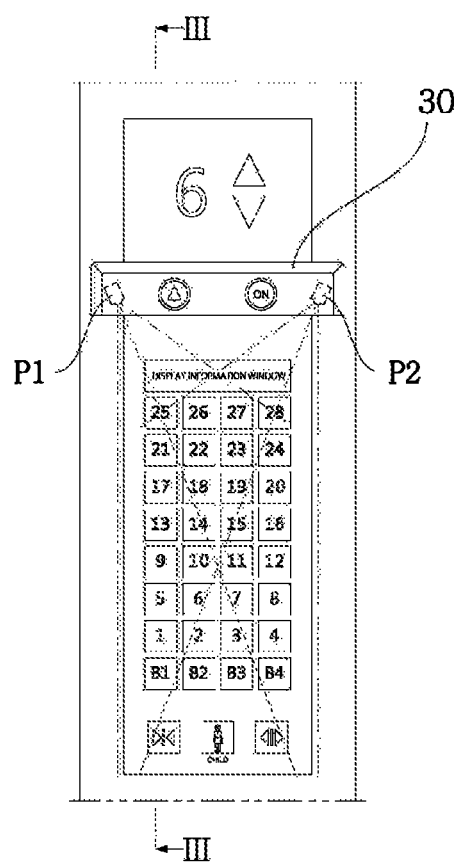
FIG. 2 is a front view of a monitor.
Figure 3:
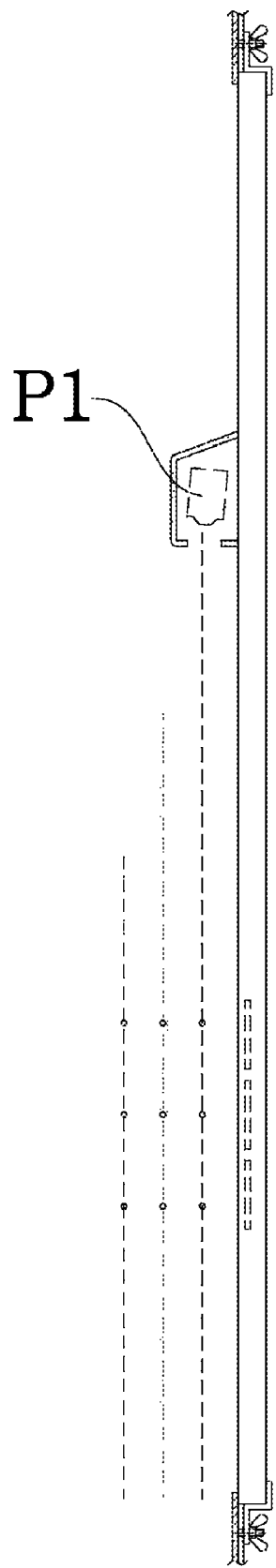
FIG. 3 is a cross-sectional view taken along line III-III of FIG. 2.

FIG. 2 is a front view of the monitor, and FIG. 3 is a cross-sectional view taken along line III-III of FIG. 2.

As illustrated in FIGS. 2 and 3, the pin cameras P1 and P2 are embedded in a pin camera embedded box 30 installed in an upper portion of the monitor M, the pin cameras P1 and P2 photograph various buttons, for example, a floor selection button and open and close buttons, displayed on the monitor through an opened lower portion of the pin camera embedded box 30, and both pin cameras photograph various manipulation buttons in duplicate at viewing angles as indicated with two dashed dot lines. A number indicating the selected floor, herein, the sixth floor, may be displayed to be large on the upper portion of the monitor, and the emergency button and the start button may also be disposed on a surface of the pin camera embedded box 30 if needed.

In the present invention, three virtual screens z1 to z3 may be set sequentially from the surface of the monitor according to a photographing angle of the front surface of the monitor by each of the pin cameras P1 and P2. That is, virtual screens z1 to z3 are sequentially set at predetermined intervals from the front surface of the monitor based on angles aimed by the pin cameras with respect to an overlapping photographed area of the two pin cameras which photograph the front surface of the monitor by using publicly known software.

Figure 4:
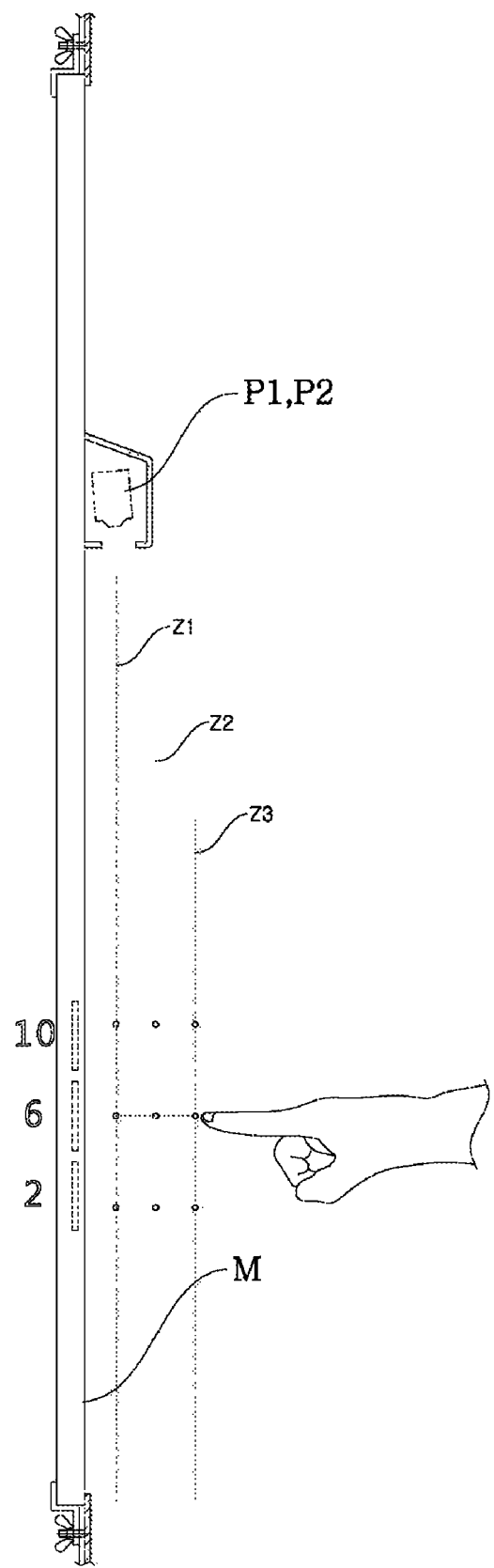
FIG. 4 is a lateral view illustrating a disposition of pin cameras and a virtual screen.

FIG. 4 is a lateral view illustrating the relation.

As illustrated, virtual screens z1 to z3 are sequentially set for the areas photographed by the pin cameras P1 and P1 from the surface of the monitor by using the publicly known software. An operator that is a finger of a passenger sequentially touches screens z3, z2, and z1 while moving toward the surface of the monitor, and touch points are detected by using an effect of blocking light of a touched point. In the present exemplary embodiment, the button of the sixth floor is the target as described above.

Figure 5:
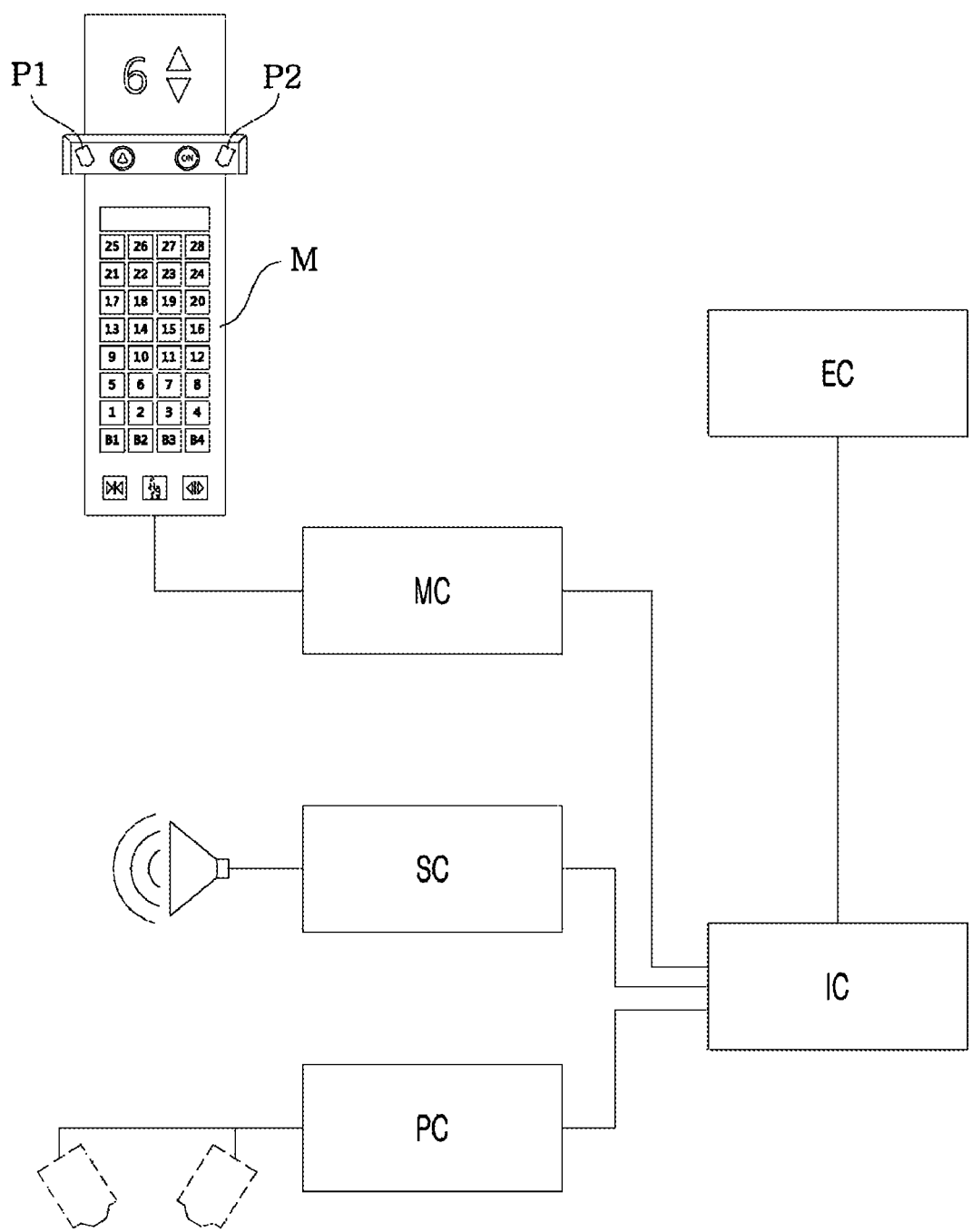
FIG. 5 is a block diagram schematically illustrating a general control relation of the present invention.

FIG. 5 is a block diagram schematically illustrating a general control relation of the present invention.

As illustrated, the present invention includes various controllers, and particularly, includes a monitor controller MC connected to the monitor M and controlling operations of various buttons of the monitor, a speaker controller SC connected to a speaker and controlling an operation of the speaker, a pin camera controller PC connected to the pin cameras P1 and P2 and controlling the operations of the pin cameras, an indicator controller IC connected to the controllers MC, SC, and PC and controlling the controllers, and an elevator controller EC connected to the indicator controller IC and controlling an operation of the elevator.

Under the control of the indicator controller IC, the monitor controller MC displays various buttons on the monitor M, and when an operator including a finger of a passenger sequentially touches screens z1 to z3, the monitor controller MC detects the touches and activates a selected button, and the elevator controller EC controls an operation of the elevator according to the activated button.

In addition, under the control of the indicator controller IC, according to the sequential touch of screens z1 to z3 by the operator, the speaker controller SC may also control a volume of the speaker, which will be described in detail below.

Figure 6:
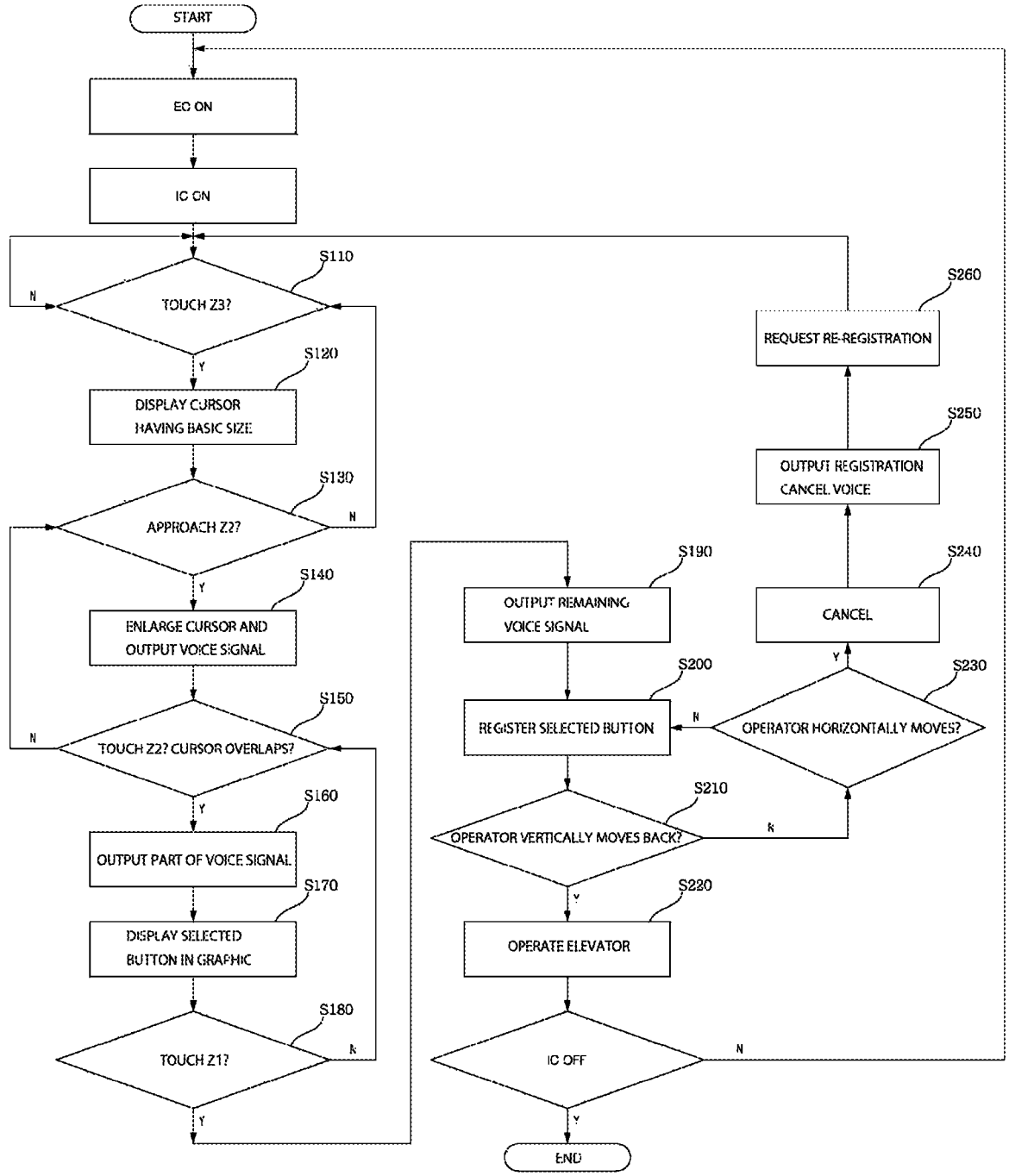
FIG. 6 is a flowchart of a control method according to the present invention.

FIG. 6 is a flowchart of a control method according to the present invention configured as described above.

After both the elevator controller EC and the indicator controller IC are operated, the monitor controller MC determines whether virtual screen z3 farthest from the surface of the monitor is touched by the operator in operation S110.

Figure 7:
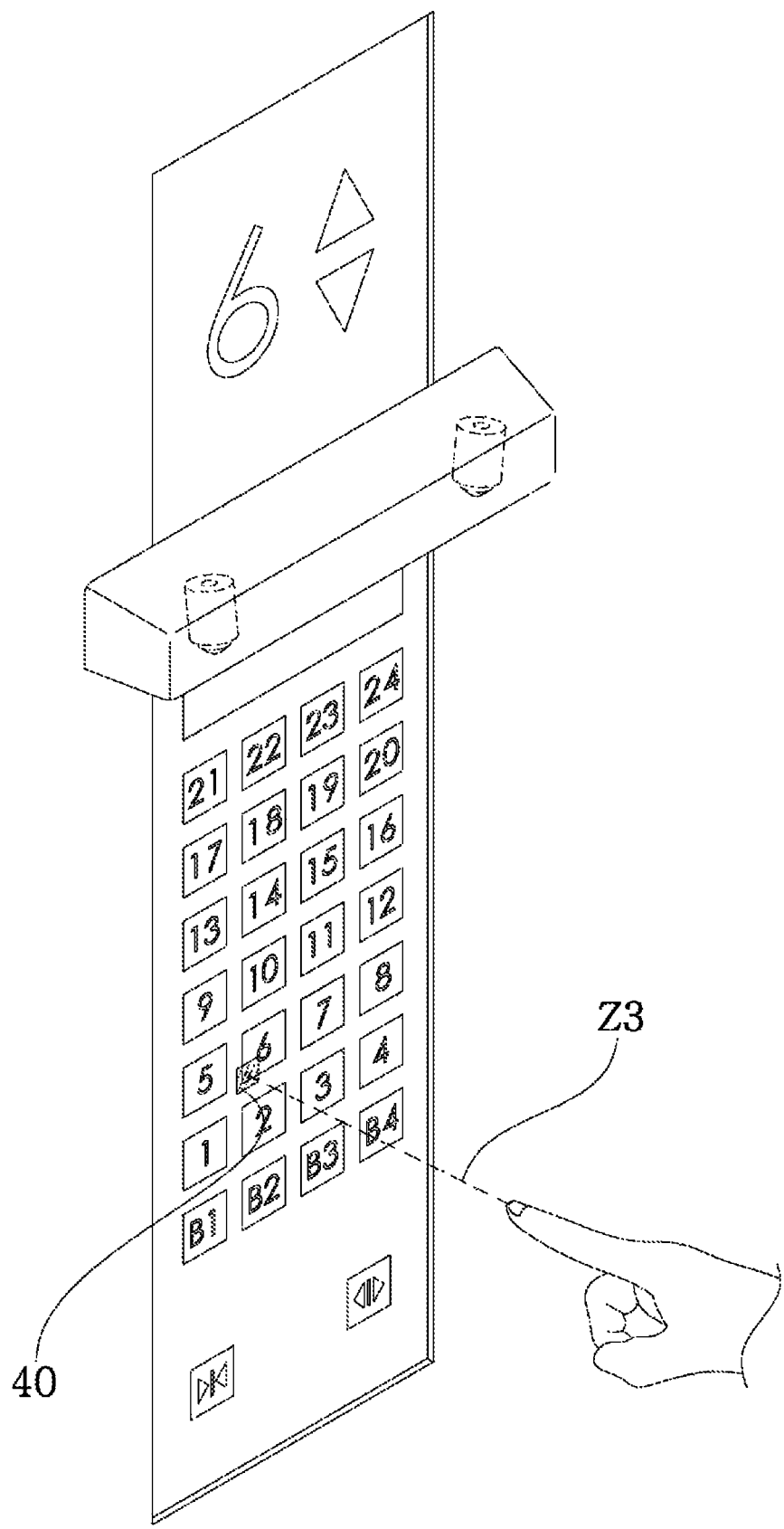
FIG. 7 is a perspective view illustrating a generation state of a cursor when screen z3 is touched.

When it is determined that screen z3 is touched by the operator, a cursor 40 having a basic size is displayed on the monitor M by the monitor controller MC in operation S120 (see FIG. 7).

Figure 8:
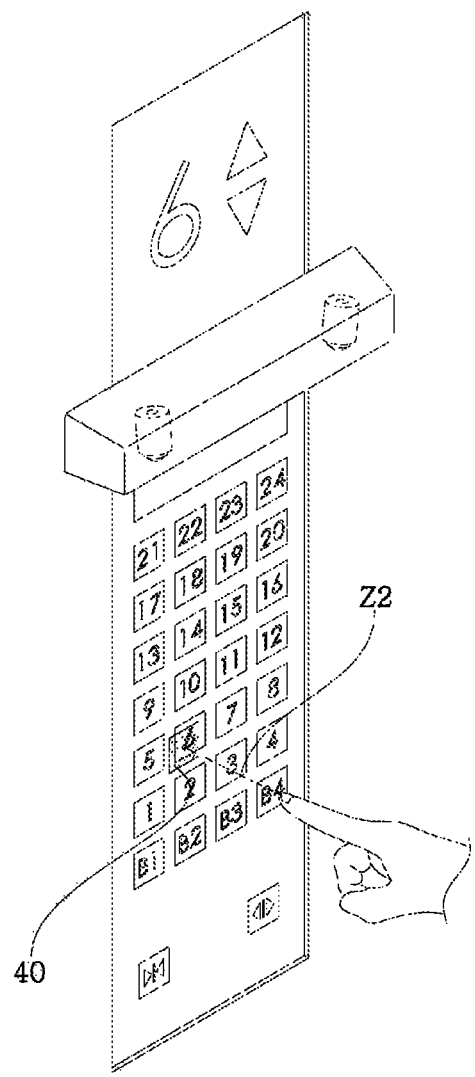
FIG. 8 is a perspective view illustrating an enlargement state of a cursor when screen z2 is touched.

In operation S130, the monitor controller MC determines whether the operator approaches toward virtual screen z2 at a center position. When it is determined that the operator dos not approach toward virtual screen z2, the procedure returns to operation S110, and when it is determined that the operator approaches toward virtual screen z2, the size of the cursor 40 is increased by the monitor controller MC and a predetermined voice signal is output from the speaker by the speaker controller SC in operation S140 (see FIG. 8).

In operation S150, the monitor controller MC determines whether the operator touches screen z2 and the cursor 40 overlaps the selected button by a predetermined size.

When it is determined that the operator does not touch screen z2, the procedure returns to operation S130, and when it is determined that the operator touches screen z2, a part of a voice signal of the floor corresponding to the selected button is output from the speaker by the speaker controller SC in operation S160, and subsequently, the selected button is enlarged or is displayed in desired graphic by the monitor controller MC in operation S170.

Next, in operation S180, the monitor controller MC determines whether the operator touches screen z1 that is closest to the monitor.

When it is determined that the operator does not touch screen z1, the procedure returns to operation S150, and when it is determined that the operator touches screen z1, the remaining voice signal is output by the speaker controller SC in operation S190, and subsequently, the selected button is registered by the monitor controller MC in operation S200.

Figure 9:
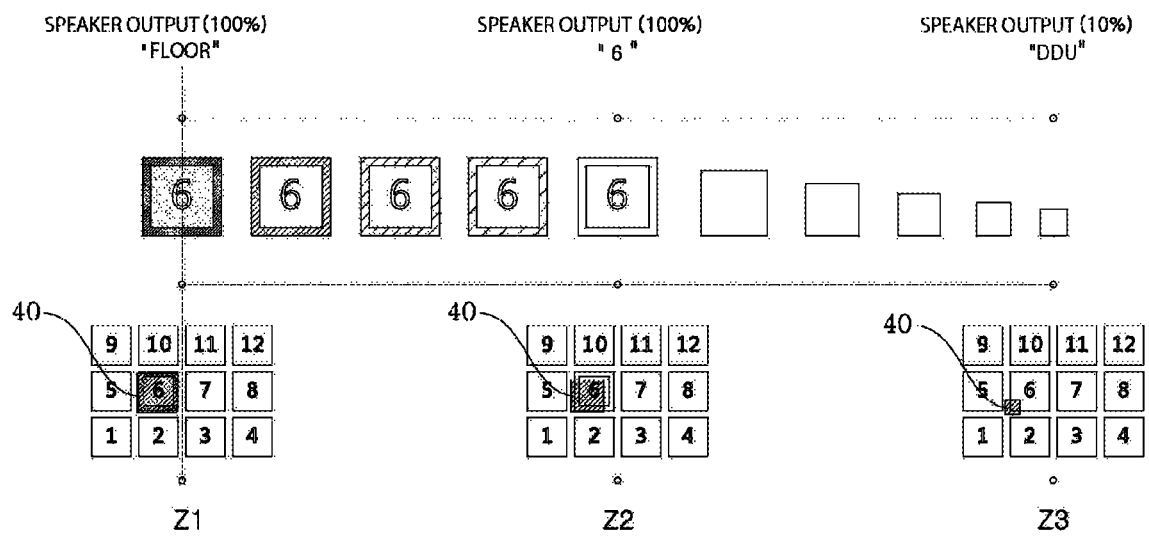
FIG. 9 is a diagram sequentially illustrating a change process of a cursor and a selection button when the sixth floor is selected.

FIG. 9 is a diagram sequentially illustrating the foregoing progressing process from the right side to the left side when the sixth floor is selected.

As illustrated, when the operator touches screen z3, the basic cursor 40 is displayed at the position of the button of the sixth floor, the speaker faintly outputs a sound, for example, "DDu", with an output of, for example, about 10%, the cursor 40 is gradually increased and output strength of a voice signal is increased while the operator moves toward screen z2, when the operator touches screen z2, the speaker outputs the voice signal of "sixth" with an output of about 100% and simultaneously, the button of "Sixth Floor" is displayed in desired graph, in which the button of "Sixth Floor" is displayed with duplicate boundaries so as to be discriminated from other buttons, and when the operator touches screen z1, the speaker outputs the voice signal of "floor" with strength of 100% and simultaneously the button of "Sixth Floor" is registered. As a matter of course, desired graphic may be set, such as the gradual darkening of a color of the button of "Sixth floor" or the gradual enlargement of the button of "Sixth floor" in the middle of the process if necessary. As a matter of course, the output strength of the speaker and a shape of the selected button may also be different as needed.

In the meantime, the present invention has a function of preventing a malfunction when a button is incorrectly selected due to fun or a mistake.

To this end, in operation S210, the monitor controller MC first determines whether an operator vertically moves back from the monitor. That is, when a passenger selects a target button with the finger and then immediately detaches the finger from the target button, a normal operation is executed. Because of this, when it is determined that the passenger moves back, an operation corresponding to the registered button is executed by the elevator controller EC in operation S220.

However, when it is determined that the operator does not move back in operation S210, the monitor controller MC determines whether the operator horizontally moves a predetermined distance in operation S230. In this case, when it is determined that the operator horizontally moves, the registered button is cancelled by the monitor controller MC in operation S240.

Figure 10:
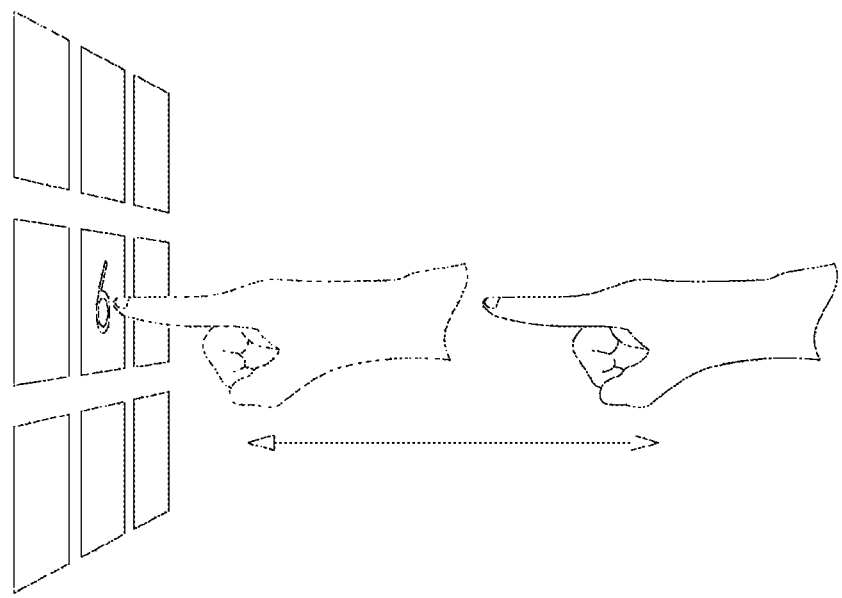
FIGS. 10 and 11 are perspective views illustrating examples of a normal operation situation and a malfunction situation, respectively.
Figure 11:
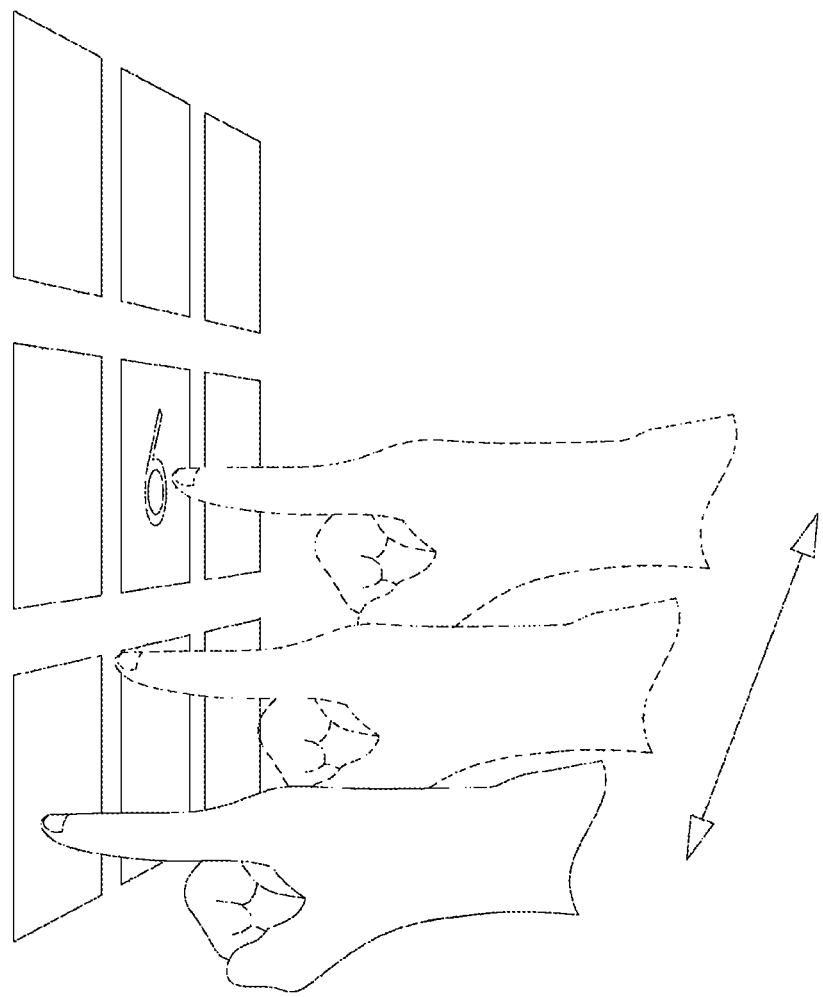

FIGS. 10 and 11 are perspective views illustrating the foregoing situation.

When the operator touches the button of the sixth floor and moves back in a direction of an arrow as illustrated in FIG. 10, it is determined that the operator normally performs the selection.

When the operator moves to the side in an direction of an arrow in a situation where the operator selects the sixth floor as illustrated in FIG. 11, it is considered that the operator was playing for fun and it is determined that a malfunction is generated. If necessary, a threshold value of a distance of the movement to the side is set, and when the operator moves by a distance of the threshold value or more, it may be set that a malfunction is generated.

Next, a voice signal notifying the cancelling of the registration is output from the speaker by the speaker controller SC in operation S250, and a request for re-registration is displayed by the monitor controller MC in operation S260.

In the meantime, the selected button may also be enlarged and displayed on an upper portion of the monitor. In this case, this may be a great help to visually impaired people having poor vision.

Further, the present invention may also selectively display a child mode for short children.

Figure 12:
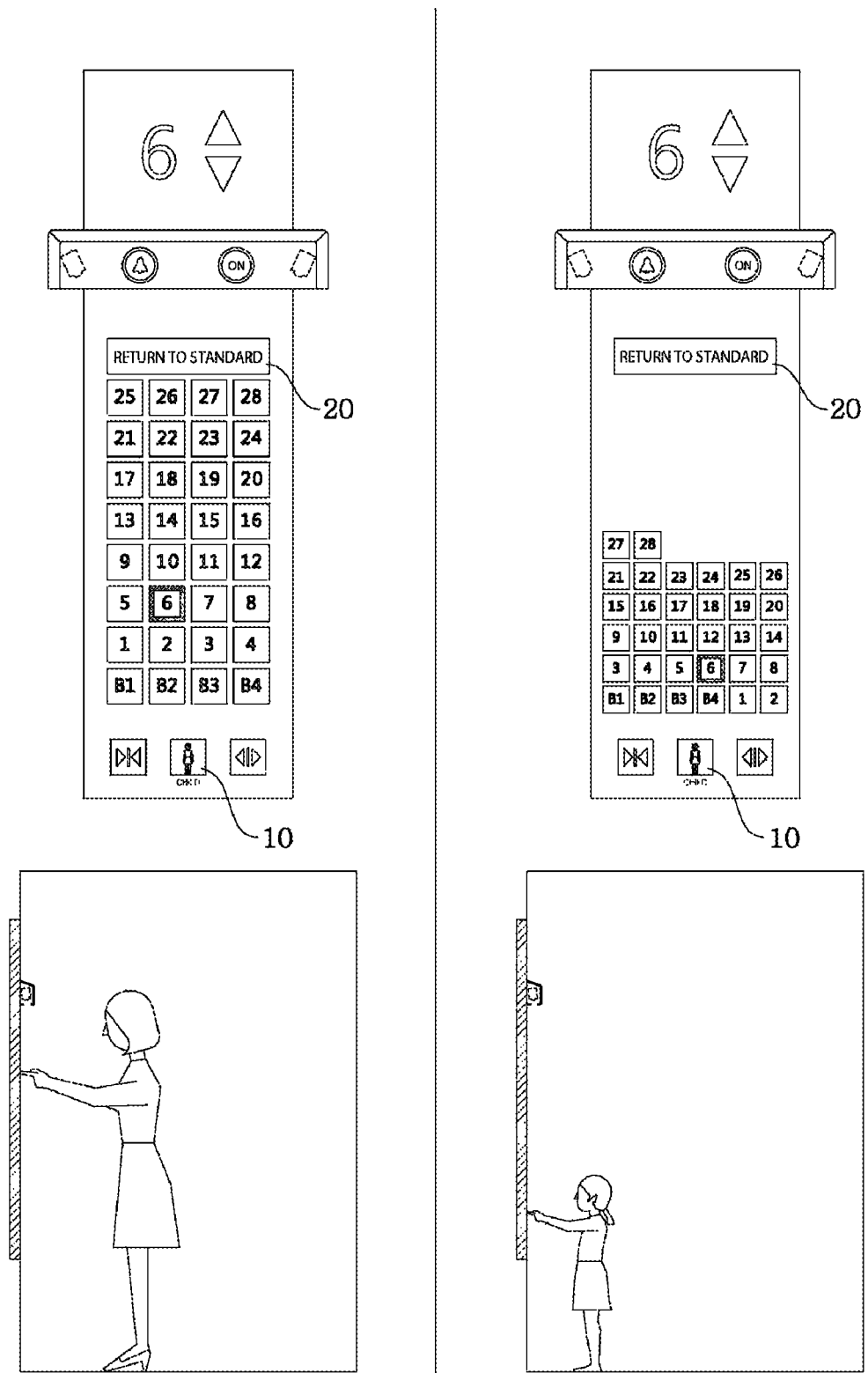
FIG. 12 is an explanation diagram illustrating a situation of a standard mode and a child mode.

To this end, a child mode selection button 10 and a standard return button 20 are displayed in a lower portion and an upper portion of the monitor M, respectively, and when the child mode selection button 10 is operated under the control of the monitor controller MC, all of the buttons of the monitor may be displayed in the lower portion of the monitor M, and when the standard return button 20 is operated, all of the buttons may be returned to original states. FIG. 12 is a diagram illustrating the relation. When an operator presses the child mode selection button 10 in a standard button array at the left side of the FIG. 12, the operation buttons are arranged in the lower portion of the monitor like the right side of FIG. 12, so that even short children may easily touch the button.

When the operator presses the standard return button 20, all of the buttons may be returned to the original states, but when the child mode selection button 10 is operated and then a predetermined time elapses, all of the buttons may be automatically returned to the original states.

Figure 13:
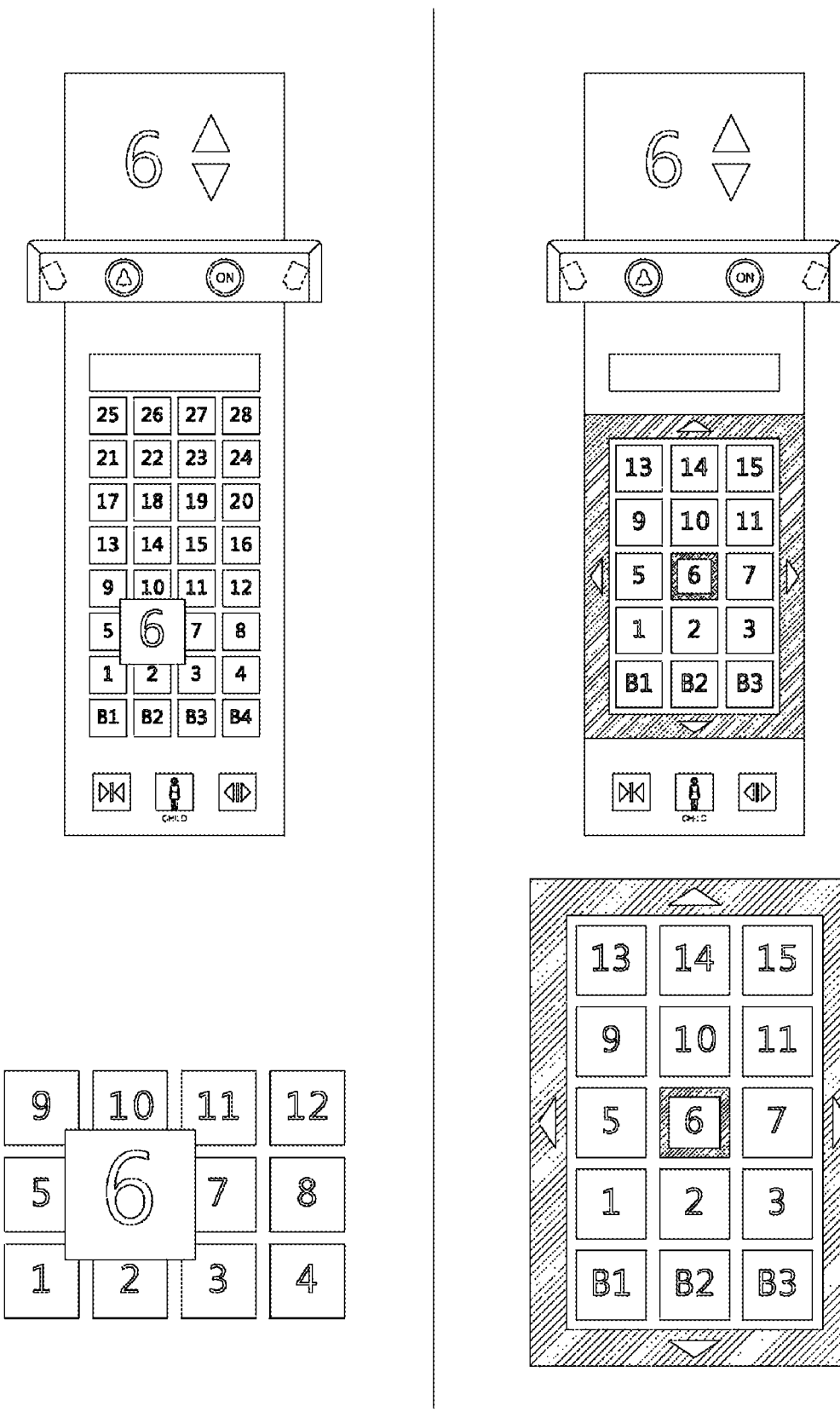
FIG. 13 is a diagram illustrating another example of displaying a selected button.

FIG. 13 is a diagram illustrating another example of displaying a selected button.

Only the selected button of the "Sixth Floor" is enlarged and displayed as illustrated at the left side of FIG. 13 or all of the buttons are enlarged and displayed as illustrated at the right side of FIG. 13, and the selected button of the "Sixth Floor" may also be displayed in a different color or shape.

Further, in order to accurately measure a position, the present invention is described based on the two pin cameras as an example, but only one pin camera may also be used, and three or more pin cameras may also be used in order to further improve accuracy, as necessary. In addition, other photographing devices having the similar function as that of the pin camera may also be used.

In addition, the monitor may also be installed on a wall surface of the building next to the hall door of the elevator or on a surface of the hall door of the elevator.

The invention claimed is:

1. A device for controlling an operation of an elevator by using a monitor, the device comprising:
a monitor, which is installed on a wall surface of a cage of an elevator, a surface of a door of the elevator, or a wall surface of a building next to the door of the elevator, displays various buttons including a start button, an emergency button, and floor buttons controlling an operation of the elevator, and includes an embedded speaker;
two pin cameras positioned at upper left and right sides of the monitor, respectively; and
a controller, which controls operations of the various buttons of the monitor, an operation of the pin cameras, and the operation of the elevator,
wherein the controller controls the two pin cameras next to each other on a front surface of the monitor to photograph images, and sequentially sets two-dimensional virtual screens z1, z2, and z3 at intervals parallel to the monitor based on photographing angles of the pin cameras in an overlapping photographed portion, in which virtual screen z1 among virtual screens z1, z2, and z3 is formed to be closest to the monitor, and screen z3 is formed to be farthest from the monitor,
wherein the controller controls the various buttons to be displayed on the monitor, and in response to an operator using a finger, touching virtual screens z1 to z3 in order of z3, z2, and z1, the controller activates a selected button among the various buttons of the monitor and controls the operation of the elevator according to the activated button, and in response to the operator touching virtual screen z3, the controller displays a cursor having a basic size on the monitor and determines whether the operator approaches toward virtual screen z2 at a center position, and wherein the controller enlarges the size of the cursor in response to the operator being determined to approach toward virtual screen z2.

2. The device of claim 1, wherein a child mode selection button and a standard return button are displayed in a lower portion and an upper portion of the monitor, respectively, and wherein all of the buttons of the monitor are displayed in the lower portion of the monitor in response to the child mode selection button being operated, and all of the buttons are returned to original states in response to elapse of a predetermined time without any operation of a button or the standard return button being operated.

3. The device of claim 2, wherein the pin cameras are embedded in a pin camera embedded box installed in the upper portion of the monitor, and the pin cameras photograph images through an opened lower portion of the pin camera embedded box.

4. A method of controlling an operation of an elevator performed by a device for controlling an operation of an elevator, the device including: a monitor, which is installed on a wall surface of a cage of an elevator, a surface of a door of the elevator, or a wall surface of a building next to the door of the elevator and displays various buttons controlling an operation of the elevator; two pin cameras positioned at upper left and right sides of the monitor, respectively; and a controller, which controls operations of the various buttons of the monitor, an operation of the pin cameras, and the operation of the elevator, the method comprising:

photographing, by the two pin cameras next to each other on a front surface of the monitor to photograph images, and sequentially setting two-dimensional virtual screens z1, z2, and z3 at intervals parallel to the monitor based on photographing angles of the pin cameras in an overlapping photographed portion, in which virtual screen z1 among virtual screens z1, z2, and z3 is formed to be closest to the monitor, and screen z3 is formed to be farthest from the monitor, and displaying various buttons through the monitor;

displaying a cursor having a basic size on the monitor in response to the operator touching virtual screen z3;

enlarging the size of the cursor in response to the operator approaching toward virtual screen z2;

determining whether there is a button overlapping the cursor by a predetermined size or more among the various buttons, on which the cursor is displayed, after the operator touches virtual screen z2 and determining a selected button;

enlarging the selected button or displaying the selected button in desired graphic in response to the operator being determined to touch virtual screen z2;

determining whether the operator touches virtual screen z1;

returning to the determining whether there is a button overlapping the cursor by the predetermined size or more among the various buttons, on which the cursor is displayed, and determining the selected button in response to the operator being determined not to touch virtual screen z1, registering the selected button in response to the operator being determined to touch virtual screen z1; and executing an operation corresponding to the registered button.

5. The method of claim 4, wherein the executing of the operation corresponding to the registered button includes:

executing the operation corresponding to the registered button in response to the operator vertically moving back.

6. The method of claim 4, wherein the executing of the operation corresponding to the registered button includes:

cancelling the registration of the button and displaying a request for re-registration through the monitor in response to the operator horizontally moving by a predetermined distance without moving vertically back.

7. The method of claim 4, wherein the device for controlling the operation further includes a speaker embedded in the monitor, and the method further comprises:

outputting a predetermined voice signal through the speaker in response to the operator approaching virtual screen z2 after touching virtual screen z3;

outputting a part of a voice signal of a floor corresponding to the selected button through the speaker in response to the operator touching virtual screen z2; and outputting the remaining voice signal of the floor through the speaker in response to the operator touching virtual screen z1.

8. The device of claim 1, further comprising:

a speaker embedded in the monitor, wherein the controller enlarges the size of the cursor and outputs a predetermined voice signal through the speaker in response to the operator touching virtual screen z3 and then to approach virtual screen z2, wherein the controller outputs a part of a voice signal of a floor corresponding to the selected button overlapping the cursor by a predetermined size or more through the speaker in response to the operator touching virtual screen z2, wherein the controller outputs the remaining voice signal of the floor through the speaker in response to the operator touching virtual screen z1.

9. The device of claim 1, wherein after the controller activates the selected button among the various buttons of the monitor and before the controller controls the operation of the elevator according to the activated button, wherein the controller executes the operation of the elevator corresponding to the activated button; and the controller cancels the activation of the selected button and displays a request for re-registration through the monitor in response to the operator moving horizontally.

10. The device of claim 2, wherein the pin cameras are embedded in a pin camera embedded box installed in the upper portion of the monitor, and the pin cameras photograph images through an opened lower portion of the pin camera embedded box.

\* \* \* \* \*